(12) United States Patent
Yu

(10) Patent No.: US 12,732,319 B2
(45) Date of Patent: Sep. 8, 2026

(54) FRAME EXCHANGE SEQUENCE FOR MULTI-AP COOPERATION

(71) Applicant: Avalon Technology Solutions LLC, Frisco, TX (US)

(72) Inventor: Heejung Yu, Daejeon (KR)

(73) Assignee: Avalon Technology Solutions LLC, Frisco, TX (US)

( * ) Notice: Subject to any disclaimer, the term of this patent is extended or adjusted under 35 U.S.C. 154(b) by 49 days.

(21) Appl. No.: 18/645,036

(22) Filed: Apr. 24, 2024

(65) Prior Publication Data

US 2024/0275544 A1 Aug. 15, 2024

Related U.S. Application Data

(63) Continuation of application No. PCT/US2022/078534, filed on Oct. 21, 2022.

(60) Provisional application No. 63/263,126, filed on Oct. 27, 2021.

(51) Int. Cl.

| | |
|---|---|
| ***H04L 5/00*** | (2006.01) |
| ***H04B 7/06*** | (2006.01) |
| ***H04L 27/26*** | (2006.01) |

(52) U.S. Cl.

CPC ......... *H04L 5/0048* (2013.01); *H04B 7/0617* (2013.01); *H04L 27/2602* (2013.01)

(58) Field of Classification Search

CPC . H04L 5/0048; H04L 27/2602; H04B 7/0617; H04B 7/024; H04B 7/0632; H04W 48/12; H04W 84/12; H04W 76/15; H04W 72/23

See application file for complete search history.

(56) References Cited

U.S. PATENT DOCUMENTS

| | | | | |
|---|---|---|---|---|
| 11,139,863 | B2 | 10/2021 | Lee et al. | |
| 2010/0260138 | A1* | 10/2010 | Liu | H04L 5/0023 370/330 |
| 2020/0403680 | A1* | 12/2020 | Li | H04B 7/0632 |

(Continued)

FOREIGN PATENT DOCUMENTS

| | | | |
|---|---|---|---|
| WO | 2021201771 | A1 | 10/2021 |

OTHER PUBLICATIONS

International Search Report and Written Opinion for International Application No. PCT/US2022/078534 mailed Jan. 5, 2023 (16 pages).

(Continued)

*Primary Examiner* — David S Huang

(74) *Attorney, Agent, or Firm* — Nutter McClennen & Fish LLP

(57) ABSTRACT

A method by a wireless device functioning as a master AP in a wireless network to perform multi-AP cooperation with a slave AP. The method includes generating a first null data packet (NDP) announcement frame, wherein the first NDP announcement frame includes first information for a first non-AP station (STA) and second information for the slave AP, wherein the first information indicates to the first STA that a NDP frame is to be transmitted to the first STA and the second information indicates to the slave AP to wirelessly transmit a NDP frame to the first STA. The method further includes wirelessly transmitting the NDP announcement frame to the first STA and the slave AP.

20 Claims, 16 Drawing Sheets

Master AP Operations
1700

GENERATE A FIRST NULL DATA PACKET (NDP) ANNOUNCEMENT FRAME, WHEREIN THE FIRST NDP ANNOUNCEMENT FRAME INCLUDES FIRST INFORMATION FOR A FIRST NON-AP STATION (STA) AND SECOND INFORMATION FOR THE SLAVE AP, WHEREIN THE FIRST INFORMATION INDICATES TO THE FIRST STA THAT A NDP FRAME IS TO BE TRANSMITTED TO THE FIRST STA AND THE SECOND INFORMATION INDICATES TO THE SLAVE AP TO WIRELESSLY TRANSMIT A NDP FRAME TO THE FIRST STA
1702

WIRELESSLY TRANSMIT THE FIRST NDP ANNOUNCEMENT FRAME TO THE FIRST STA AND THE SLAVE AP
1704

JTX or CoBF?
1706
CoBF
A
JTX

WIRELESSLY TRANSMIT A NDP FRAME TO THE FIRST STA, WHEREIN THE SLAVE AP ALSO WIRELESSLY TRANSMITS A NDP FRAME TO THE FIRST STA AFTER THE MASTER AP WIRELESSLY TRANSMITS THE FIRST NDP ANNOUNCEMENT FRAME TO THE FIRST STA AND THE SLAVE AP
1708

WIRELESSLY RECEIVE A COMPRESSED BEAMFORMING CHANNEL QUALITY INDICATOR (CBF/CQI) FRAME FROM THE FIRST STA, WHEREIN THE SLAVE AP ALSO WIRELESSLY RECEIVES THE CBF/CQI FRAME FROM THE FIRST STA
1710

WIRELESSLY TRANSMIT A JOINT TRANSMISSION DATA FRAME TO THE FIRST STA JOINTLY WITH THE SLAVE AP
1712

(56) References Cited

U.S. PATENT DOCUMENTS

| | | | | |
|---|---|---|---|---|
| 2020/0413278 | A1 | 12/2020 | Zhou et al. | |
| 2021/0014853 | A1 | 1/2021 | Wang et al. | |
| 2021/0044333 | A1 | 2/2021 | Jiang et al. | |
| 2021/0226671 | A1 | 7/2021 | Vermani et al. | |
| 2021/0307099 | A1 | 9/2021 | Ryu et al. | |
| 2023/0224008 | A1* | 7/2023 | Yukawa | H04B 7/024 370/329 |
| 2023/0319886 | A1* | 10/2023 | Wang | H04L 5/0035 370/329 |
| 2024/0121143 | A1* | 4/2024 | Huang | H04L 27/2602 |

OTHER PUBLICATIONS

International Preliminary Report on Patentability for International Application No. PCT/US2022/078534 mailed May 10, 2024 (15 pages).

Extended European Search Report for International Application No. PCT/US2022/078534 mailed Aug. 12, 2025, 12 pages.

* cited by examiner

| | MAXIMUM PHY RATE | PHY RATE ENHANCEMENT | BANDWIDTH/NUMBER OF SPATIAL STREAMS | OPERATING BANDS |
|---|---|---|---|---|
| IEEE 802.11B | 11 MBPS | - | 22 MHZ/1 SS | 2.4 GHZ |
| IEEE 802.11A/G | 54 MBPS | 5X | 2 MHZ/1 SS | 5 GHZ(A)/2.4 GHZ(G) |
| IEEE 802.11N | 600 MBPS | 11X | 40 MHZ/4 SS | 2.4/5 GHZ |
| IEEE 802.11AC | 6.9 GBPS | 11X | 160 MHZ/8 SS | 5 GHZ |
| IEEE 802.11AX | 9.6 GBPS | 1.4X | 160 MHZ/8 SS | 2.4/5 GHZ |
| IEEE 802.11BE | A GBPS | BX | 320 MHZ/16 SS | 2.4/5/6 GHZ |

700

| ELEMENT/FIELD | DEFINITION 702 | DURATION 704 | DFT PERIOD 706 | GUARD INTERVAL (GI) 708 | SUBCARRIER SPACING 710 |
|---|---|---|---|---|---|
| LEGACY-SHORT TRAINING FIELD (L-STF) 712 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 714 | NON-HT LONG TRAINING FIELD (LTF) | 8 μs | 3.2 μs | 1.6 μs | 312.5 kHz |
| LEGACY-SIGNAL FIELD (L-SIG) 716 | NON-HT SIGNAL FIELD | 4 μs | 3.2 μs | 0.8 μs | 312.5 kHz |
| RL-SIG FIELD 718 | REPEATED NON-HT SIGNAL FIELD | 4 μs | 3.2 μs | 0.8 μs | 312.5 kHz |
| U-SIG FIELD 720 | UNIVERSAL SIGNAL FIELD | $N_{USIG}$ * 4 μs | 3.2 μs | 0.8 μs | 312.5 kHz |
| EHT-SIG FIELD 722 | EHT SIGNAL FIELD | $N_{EHESIG}$ * 4 μs | 3.2 μs | 0.8 μs | 312.5 kHz |
| EHT-HARQ FIELD 724 | EHT HARQ FIELD | - | - | - | - |
| EHT-STF 726 | EHT SHORT TRAINING FIELD | - | - | - | - |
| EHT-LTF 728 | EHT LONG TRAINING FIELD | $N_{EHTLTF}$ * (DTF period + GI) μs | 2xLTF: 6.4 μs 4xLTF: 12.8 μs | 0.8, 1.6, or 3.2 μs | 2xLTF: (equivalent to) 156.25 kHz; 4xLTF: 78.125 kHz |
| EHT-DATA FIELD 730 | EHT DATA FIELD | $N_{DATA}$ * (DTF period + GI) μs | 12.8 μs | 0.8, 1.6, or 3.2 μs | 78.125 kHz |
| EHT-MA FIELD 732 | EHT MIDAMBLE FIELD | - | - | - | - |

FIG. 7

HE NDP Announcement Frame Format

Sounding Dialog Token Field Format

STA Info Field Format in an HE NDP Announcement Frame (AID11 is not 2047)

STA Info Field Format in an HE NDP Announcement Frame (AID11 is 2047)

1700

Master AP Operations

GENERATE A FIRST NULL DATA PACKET (NDP) ANNOUNCEMENT FRAME, WHEREIN THE FIRST NDP ANNOUNCEMENT FRAME INCLUDES FIRST INFORMATION FOR A FIRST NON-AP STATION (STA) AND SECOND INFORMATION FOR THE SLAVE AP, WHEREIN THE FIRST INFORMATION INDICATES TO THE FIRST STA THAT A NDP FRAME IS TO BE TRANSMITTED TO THE FIRST STA AND THE SECOND INFORMATION INDICATES TO THE SLAVE AP TO WIRELESSLY TRANSMIT A NDP FRAME TO THE FIRST STA
1702

WIRELESSLY TRANSMIT THE FIRST NDP ANNOUNCEMENT FRAME TO THE FIRST STA AND THE SLAVE AP
1704

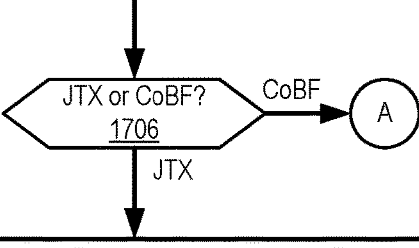

WIRELESSLY TRANSMIT A NDP FRAME TO THE FIRST STA, WHEREIN THE SLAVE AP ALSO WIRELESSLY TRANSMITS A NDP FRAME TO THE FIRST STA AFTER THE MASTER AP WIRELESSLY TRANSMITS THE FIRST NDP ANNOUNCEMENT FRAME TO THE FIRST STA AND THE SLAVE AP
1708

WIRELESSLY RECEIVE A COMPRESSED BEAMFORMING CHANNEL QUALITY INDICATOR (CBF/CQI) FRAME FROM THE FIRST STA, WHEREIN THE SLAVE AP ALSO WIRELESSLY RECEIVES THE CBF/CQI FRAME FROM THE FIRST STA
1710

WIRELESSLY TRANSMIT A JOINT TRANSMISSION DATA FRAME TO THE FIRST STA JOINTLY WITH THE SLAVE AP
1712

FIG. 17

FRAME EXCHANGE SEQUENCE FOR MULTI-AP COOPERATION

CROSS-REFERENCE TO RELATED APPLICATIONS

This application is a continuation of International Patent Application No. PCT/US2022/078534, filed Oct. 21, 2022, titled, "FRAME EXCHANGE SEQUENCE FOR MULTI-AP COOPERATION", which claims the benefit of U.S. Provisional Application No. 63/263,126, filed Oct. 27, 2021, titled, "FRAME EXCHANGE SEQUENCE FOR MULTI-AP COOPERATION IN ENHANCEMENT OF IEEE 802.11AX", each of which is hereby incorporated by reference.

TECHNICAL FIELD

The present disclosure generally relates to wireless communications, and more specifically, relates to frame exchange sequences for multi-AP cooperation.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

In the enhancement of IEEE 802.11ax (e.g., IEEE 802.11be), multiple APs can cooperate to enhance the network performance. To initiate multi-AP cooperation operations, multiple APs need to acquire channel information (e.g., compressed beamforming (CBF) and channel quality indicator (CQI) information) from multiple STAs and transmit their data at the same time. To these ends, frame exchange between the multiple APs is needed. However, the frame exchange may add additional overhead that causes network performance to be reduced.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 7 shows a table, which describes fields of an Extreme High Throughput (EHT) frame format, in accordance with some embodiments of the present disclosure.

DETAILED DESCRIPTION

Figure 1:
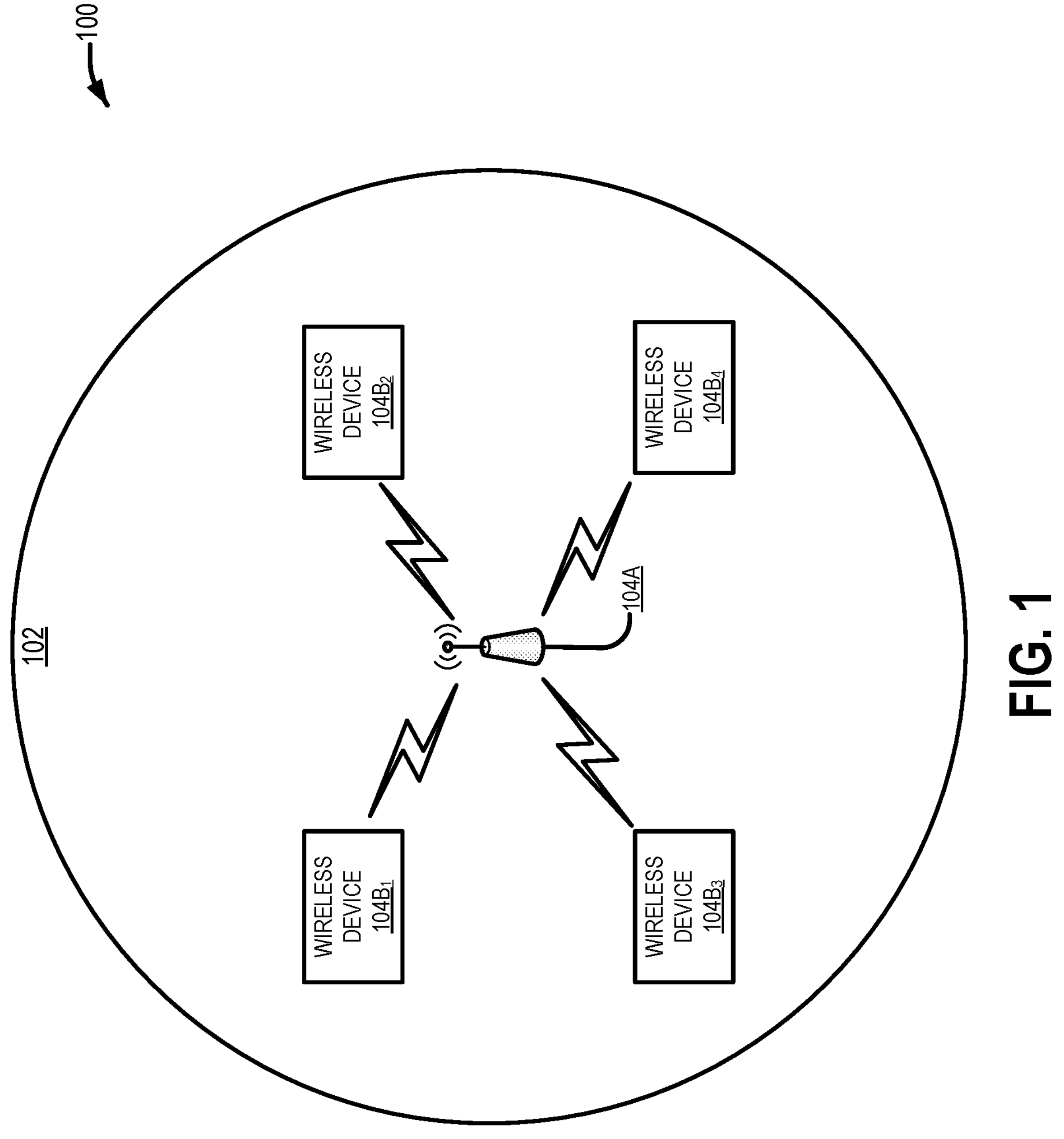
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to a frame exchange sequence for multi-AP cooperation. The frame exchange sequence may use a modified null data packet (NDP) announcement frame that contains information for multiple receivers (e.g., a cooperative access point(s) (AP(s)) and station(s) (STA(s))). Thus, the modified NDP announcement frame may include the backhaul information between a master AP and slave APs and STA access information between a master AP and STA(s). By using such a dual-function NDP announcement frame, the overhead for initiating and initializing AP cooperation can be reduced, which can improve efficiency in a wireless network.

An embodiment is a method performed by a wireless device functioning as a master AP to perform multi-AP cooperation with a slave AP. The method includes generating a first null data packet (NDP) announcement frame, wherein the first NDP announcement frame includes first information for a first non-AP station (STA) and second information for the slave AP, wherein the first information indicates to the first STA that a NDP frame is to be transmitted to the first STA and the second information indicates to the slave AP to wirelessly transmit a NDP frame to the first STA and wirelessly transmitting the NDP announcement frame to the first STA and the slave AP (e.g., as a multicast frame).

An embodiment is a method performed by a wireless device functioning as a slave AP to perform multi-AP cooperation with a master AP. The method includes wirelessly receiving a NDP announcement frame from the master AP, wherein the NDP announcement indicates to the slave AP that the slave AP is to wirelessly transmit a NDP frame to a first STA and wirelessly transmitting a NDP frame to the first STA in response to wirelessly receiving the NDP announcement frame from the master AP.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104$B_1$-104$B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104$B_1$-104$B_4$) may be collectively referred to as STAs. However, for ease of description, only the non-AP STAs may be referred to as STAs. Although shown with four non-AP STAs (e.g., the wireless devices 104$B_1$-104$B_4$), the WLAN 100 may include any number of non-AP STAs (e.g., one or more wireless devices 104B).

Figure 2:
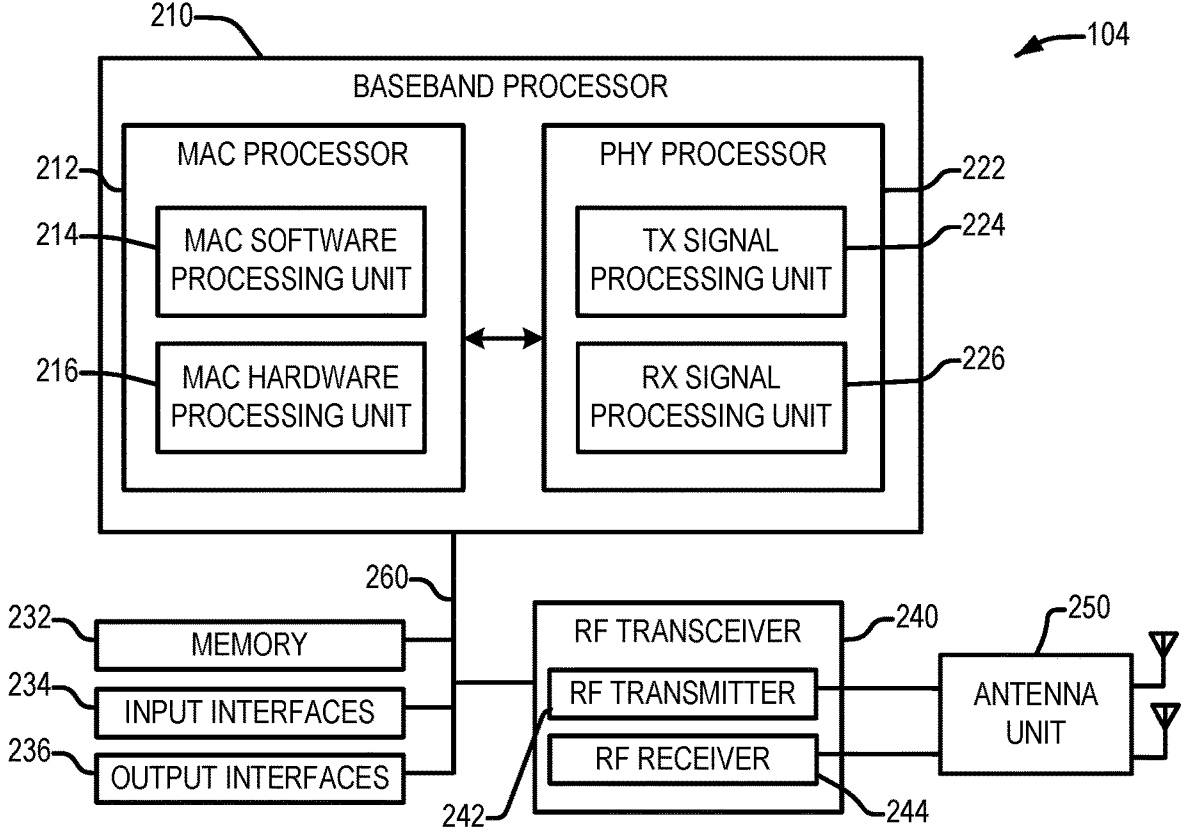
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104$B_1$-104$B_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figures 3A, 3B:
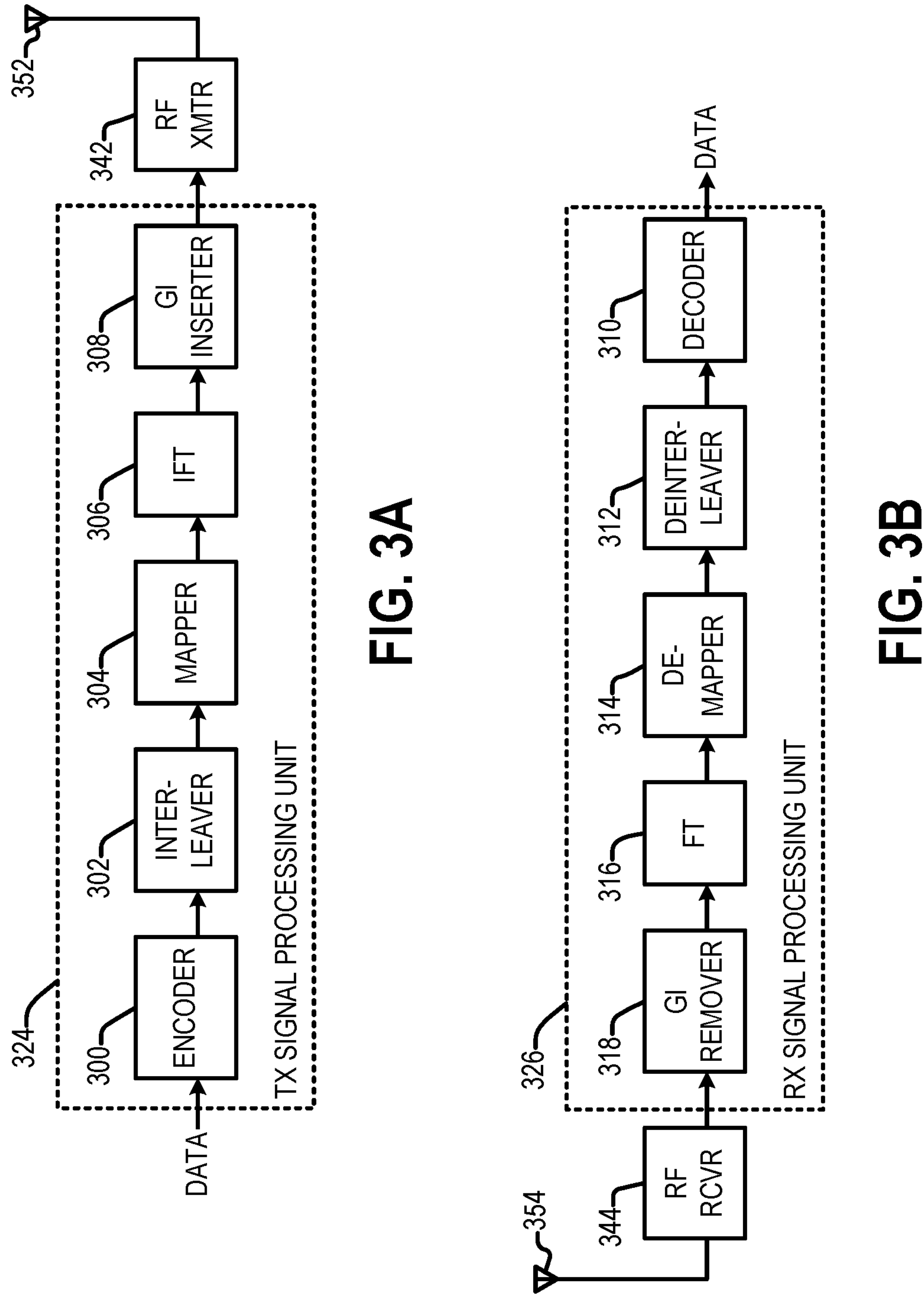
FIG. 3A illustrates components of a wireless device configured to transmit data, in accordance with some embodiments of the present disclosure.
FIG. 3B illustrates components of a wireless device configured to receive data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
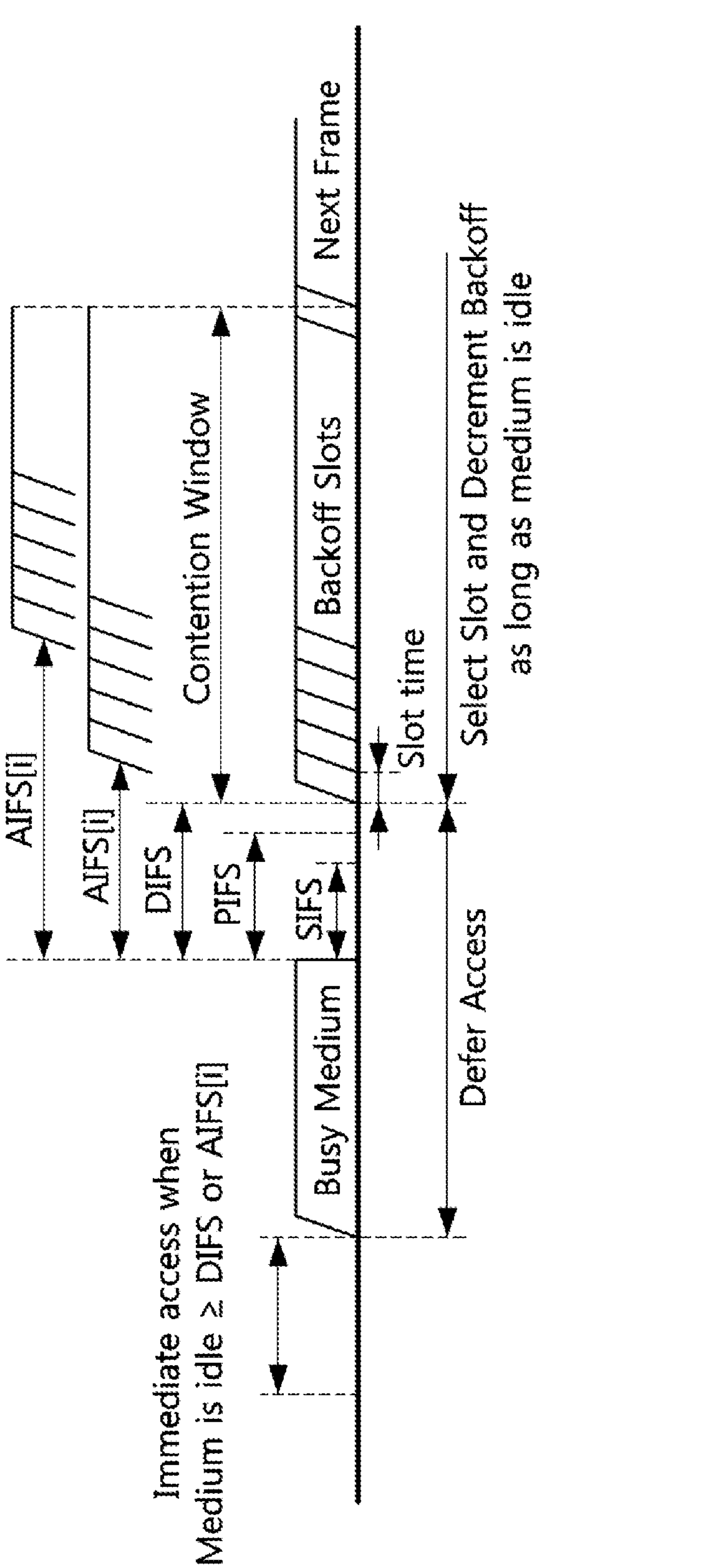
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
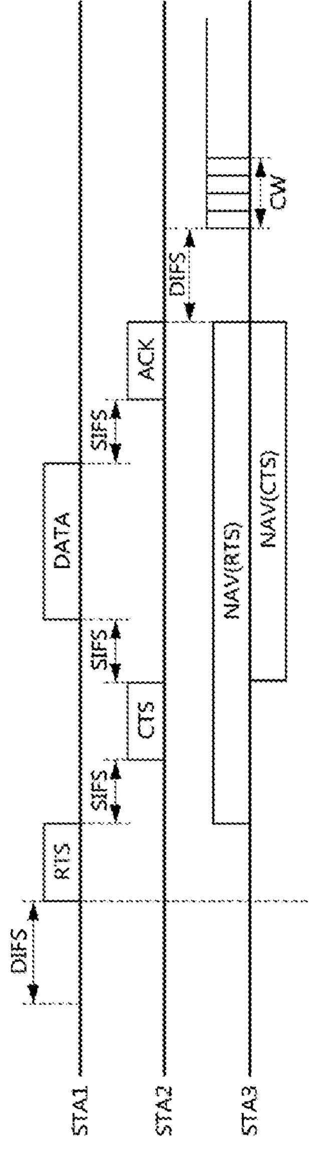
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

Figure 6:
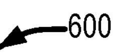
FIG. 6 shows a table comparing various iterations of Institute of Electrical and Electronics Engineers (IEEE) 802.11 standard, in accordance with some embodiments of the present disclosure.

With clear demand for higher peak throughput/capacity in a WLAN, a new working group has been assembled to generate an amendment to IEEE 802.11. This amendment is called IEEE 802.11be (i.e., Extreme High Throughput (EHT)) and was created to support an increase to the peak PHY rate of a corresponding WLAN. Considering IEEE 802.11b through 802.11ac, the peak PHY rate has been increased by 5× to 11× as shown in FIG. 6, which presents a table 600 comparing various iterations of IEEE 802.11. In case of IEEE 802.11ax, the 802.11ax working group focused on improving efficiency, not peak PHY rate in dense environments. The maximum PHY rate (A Gbps) and PHY rate enhancement (Bx) for IEEE 802.11be could rely on the highest MCS (e.g., 4,096 QAM and its code rate).

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARQ)), and (6) adaptation to regulatory rules specific to a 6 GHz spectrum.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHz) for IEEE 802.11be, more than 1 GHz of additional unlicensed spectrum is likely to be available because the 6 GHz band (5.925-7.125 GHz) is being considered for unlicensed use. This would allow APs and STAs to become tri-band devices. Larger than 160 MHz data transmissions (e.g., 320 MHz) could be considered to increase the maximum PHY rate. For example, 320 MHz or 160+160 MHz data could be transmitted in the 6 GHz band. For example, 160+160 MHz data could be transmitted across the 5 and 6 GHz bands.

In some embodiments, a transmitting STA generates a PPDU frame and transmits it to a receiving STA. The receiving STA receives, detects, and processes the PPDU. The PPDU can be an EHT PPDU that includes a legacy part (e.g., a legacy short training field (L-STF), a legacy long training field (L-LTF), and a legacy signal (L-SIG) field), an EHT signal A field (EHT-SIG-A), an EHT signal B field (EHT-SIG-B), an EHT hybrid automatic repeat request field (EHT-HARQ), an EHT short training field (EHT-STF), an EHT long training field (EHT-LTF), and an EHT-DATA field. FIG. 7 includes a table 700, which describes fields of an EHT frame format. In particular, table 700 describes various fields that may be within the PHY preamble, data field, and midamble of an EHT frame format. For example, table 700 includes definitions 702, durations 704, Discrete Fourier transform (DFTs) periods 706, guard intervals (GIs) 708, and subcarrier spacings 710 for one or more of a legacy short training field (L-STF) 712, legacy long training field (L-LTF) 714, legacy signal field (L-SIG) 716, repeated L-SIG (RL-SIG) 718, universal signal field (U-SIG) 720, EHT signal field (EHT-SIG) 722, EHT hybrid automatic repeat request field (EHT-HARQ) 724, EHT short training field (EHT-STF) 726, EHT long training field (EHT-LTF) 728, EHT data field 730, and EHT midamble field (EHT-MA) 732.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink (UL)/downlink (DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

To improve WLAN systems, AP cooperation has been discussed as a possible technology to be adopted in IEEE 802.11be, where there is high level classification depending on various AP cooperation schemes. For example, there is a first type of cooperation scheme in which data for a user is sent from a single AP (sometimes referred to as "coordinated") and there is a second type of cooperation scheme in which data for a user is sent from multiple APs (sometimes referred to as "joint").

For the coordinated scheme, multiple APs are 1) transmitting on the same frequency resource based on coordination and forming spatial nulls to allow for simultaneous transmission from multiple APs or 2) transmitting on orthogonal frequency resources by coordinating and splitting the spectrum to use the spectrum more efficiently. For the joint scheme, multiple APs are transmitting jointly to a given user.

Figures 8, 9:
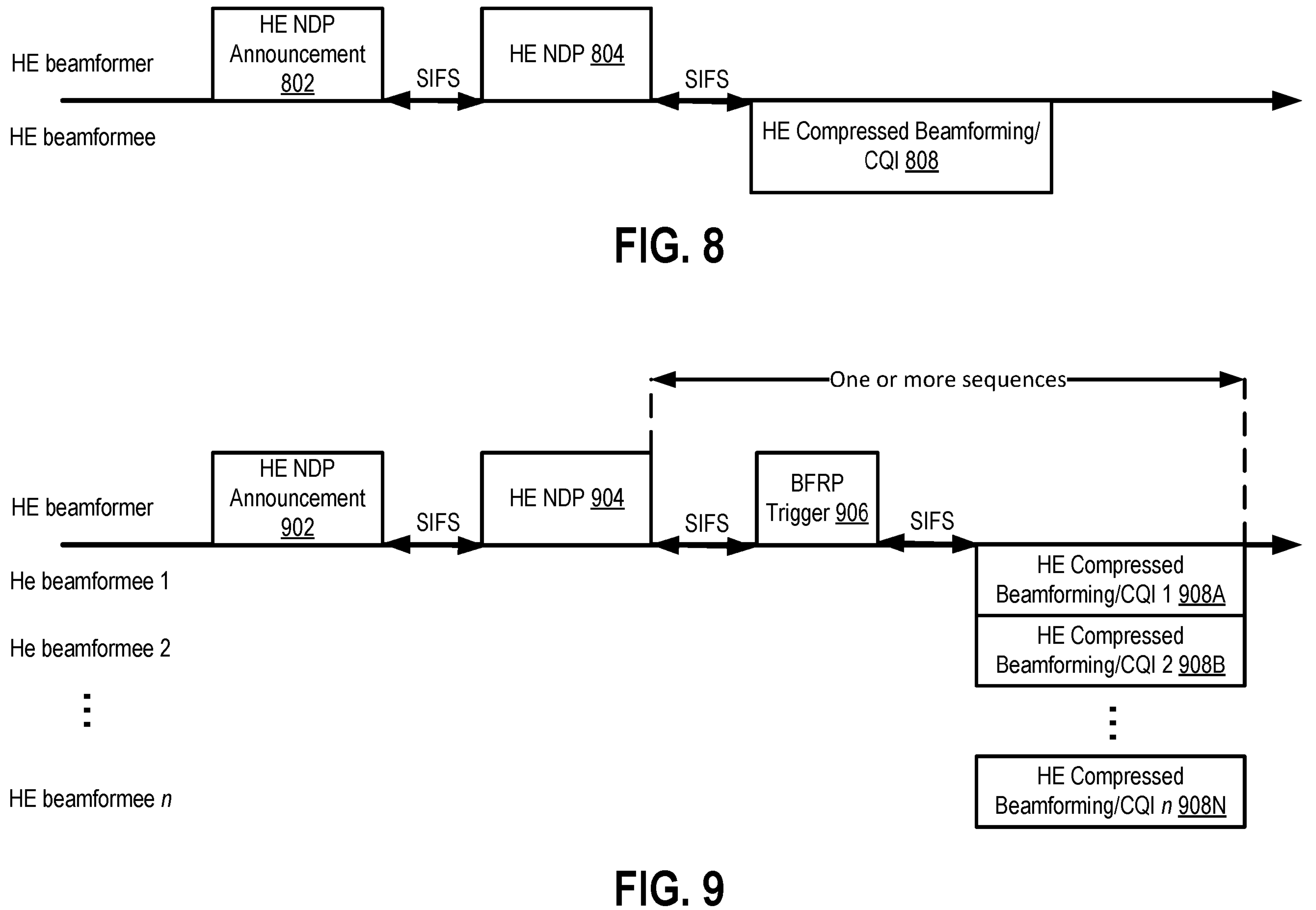
FIG. 8 is a diagram showing a frame exchange sequence for SU-MIMO in 802.11ax.
FIG. 9 is a diagram showing a frame exchange sequence for MU-MIMO in 802.11ax.

FIG. 8 is a diagram showing a frame exchange sequence for SU-MIMO in 802.11ax. As shown in the diagram, the sequence is initiated by the high efficiency (HE) beamformer transmitting a HE NDPA (null data packet announcement) frame 802. After a short interframe space (SIFS) interval, the HE beamformer transmits a HE null data packet (NDP) frame 804 (a NDP frame may also be referred to as a sounding NDP frame) to the HE beamformee to allow the HE beamformee to estimate the channel matrix and calculate the beam matrix. After another SIFS interval, the HE beamformee transmits a HE compressed beamforming/channel quality index (CBF/CQI) frame 808 that includes feedback information.

FIG. 9 is a diagram showing a frame exchange sequence for MU-MIMO in 802.11ax. As shown in the diagram, the sequence is initiated by the HE beamformer transmitting a HE NDPA frame 902. After a SIFS interval, the HE beamformer transmits a HE NDP frame 904 to the HE beamformees (e.g., HE beamformees 1-*n*) to allow the HE beamformees to estimate the channel matrix and calculate the beam matrix. After another SIFS interval, the HE beamformer transmits a beamforming report poll (BFRP) trigger frame 906. In response, the HE beamformees transmit HE CBF/CQI frames 908A-N. The transmission of the BFRP trigger frame 906 and HE CBF/CQI frames 908A-N may be repeated one or multiple times until all feedback information is fed back.

It should be noted that in IEEE 802.11ax, the NDP announcement frame is only sent to STAs to request CBF/CQI information, which can be used for beamformed transmission.

In enhancement of IEEE 802.11ax (e.g., IEEE 802.11be), multi-AP cooperation can be employed to improve the network performance in dense AP conditions. Several AP cooperation schemes such as coordinated beamforming and joint transmission require CBF/CQI information, which is a kind of channel state information between a beamformer (e.g., AP) and beamformee (e.g., STA). In a joint transmission scheme (JTX), multiple APs can be considered as one virtual AP with multiple antennas that simultaneously transmit the same data with beamforming to the same STA(s). In a coordinated beamforming scheme (CoBF), multiple APs can transmit their own data to corresponding STA(s) (e.g., AP1 transmits to STA1 and AP2 transmits to STA2). In such transmissions, there exist interfering links (e.g., the link from AP1 to STA2 and the link from AP2 to STA1 (shown by dotted lines in FIG. 10)). An objective of CoBF is to transmit each AP's data to the corresponding STA without causing interference to the other STA. Therefore, AP1 needs to obtain CBF/CQI information from STA2 (and similarly AP2 needs to obtain CBF/CQI information from STA1). Thus, a procedure to initialize the AP cooperation and obtain the proper CBF/CQI information from STA(s) is needed. Furthermore, to maximize the performance gains achieved through AP cooperative transmission, the initialization process should be simplified and minimized.

Figure 10:
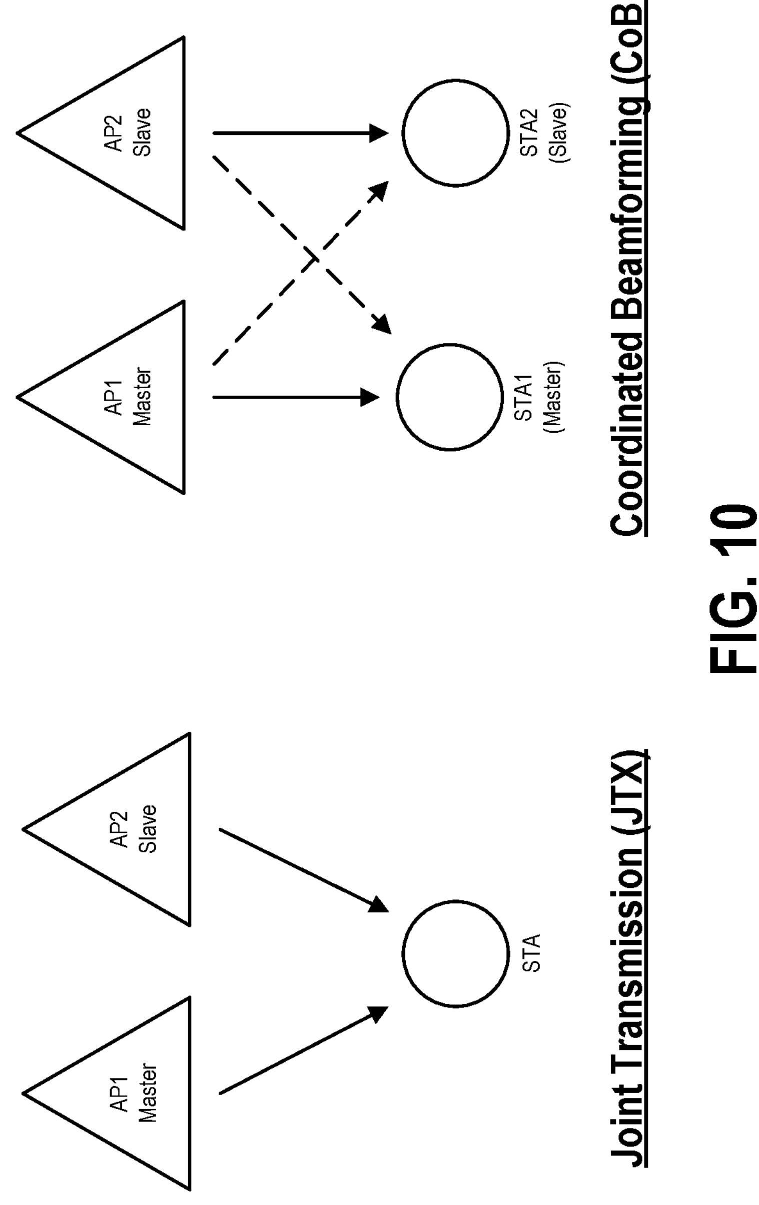
FIG. 10 is a diagram showing two types of multi-AP cooperation schemes, namely a joint transmission scheme and a coordinated beamforming scheme, according to some embodiments.

FIG. 10 is a diagram showing two types of multi-AP cooperation schemes, namely a joint transmission scheme and a coordinated beamforming scheme, according to some embodiments. As shown in the diagram, in JTX, AP1 (functioning as the master AP) and AP2 (functioning as the slave AP) transmit data to the STA jointly. As shown in the diagram, in CoBF, AP1 (functioning as the master AP) transmits data to STA1 (associated with the master AP) and AP2 (functioning as the slave AP) transmits data to STA2 (associated with the slave AP).

A master AP may transmit a request to a slave AP to initiate cooperation with the slave AP. After forming a cooperation group, the master AP and slave AP may transmit a NDP announcement frame to request CBF/CQI feedback from STA(s). If such a process is performed separately (or sequentially), there can be large overhead, which reduces gains achieved from AP cooperation. The present disclosure introduces a modified NDP announcement frame, which can be used to request AP cooperation from the slave AP and also request CBF/CQI feedback form STA(s).

Before describing the modified NDP announcement frame in more detail, a HE NDP announcement frame format is described with reference to FIG. 11. Also, a sounding dialog token field format and STA info field formats (when AID11 is 2047 and when AID 11 is not 2047) are described with reference to FIGS. 12, 13, and 14.

Figures 11, 12:
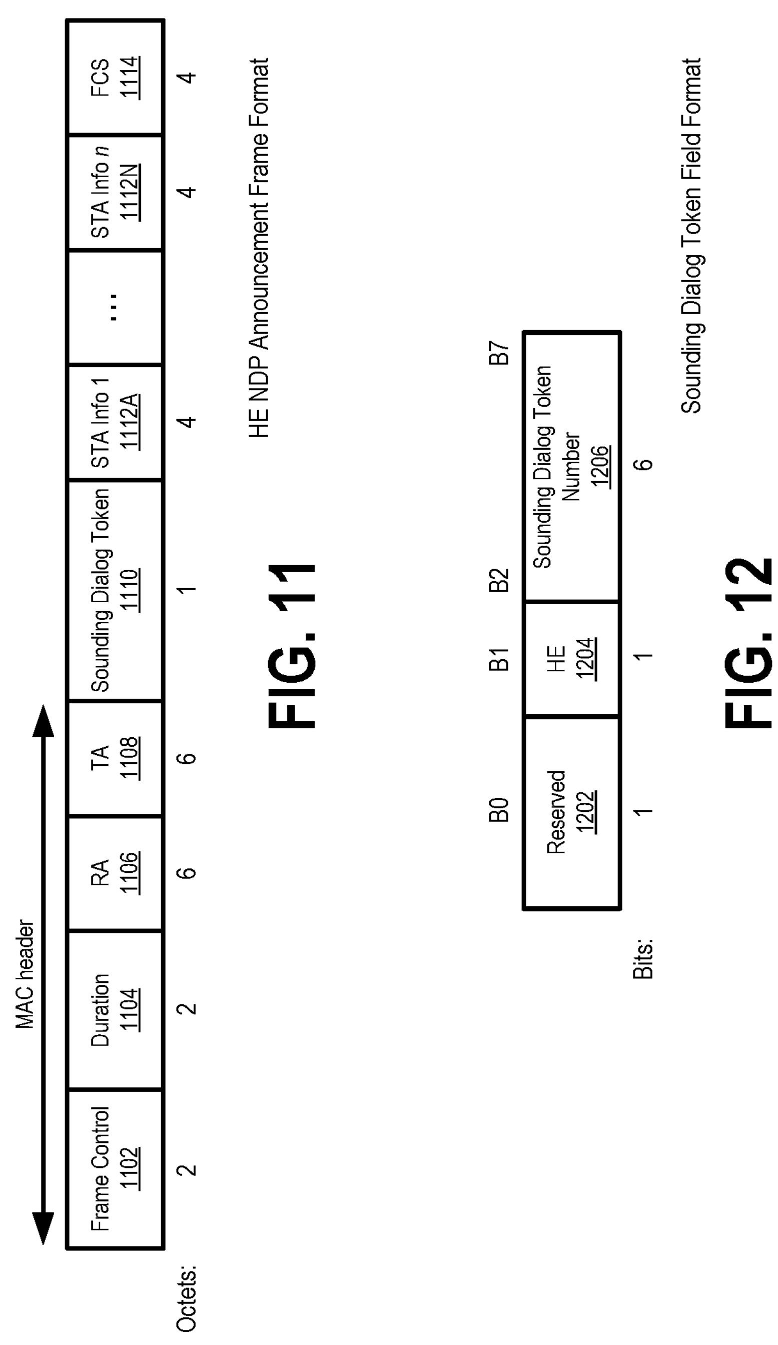
FIG. 11 is a diagram showing a high efficiency (HE) null data packet (NDP) announcement frame format in 802.11ax.
FIG. 12 is a diagram showing a sounding dialog token field format in a HE NDP announcement frame.

FIG. 11 is a diagram showing a HE NDP announcement frame format in 802.11ax. As shown in the diagram, the HE NDP announcement frame format includes a frame control field 1102 (2 octets), a duration field 1104 (2 octets), a RA field 1106 (6 octets), a TA field 1108 (6 octets), a sounding dialog token field 1110 (1 octet), station (STA) info fields 1-n 1112A-N (each field is 4 octets), and a FCS field 1114 (4 octets). The frame control field 1102, the duration field 1104, the RA field 1106, and the TA field 1108 may collectively form the media access control (MAC) header of the frame.

FIG. 12 is a diagram showing a sounding dialog token field format in a HE NDP announcement frame. As shown in the diagram, the sounding dialog token field format includes a reserved field 1202 (1 bit), a HE field 1204 (1 bit), and a sounding dialog token number field (6 bits).

Figure 13:
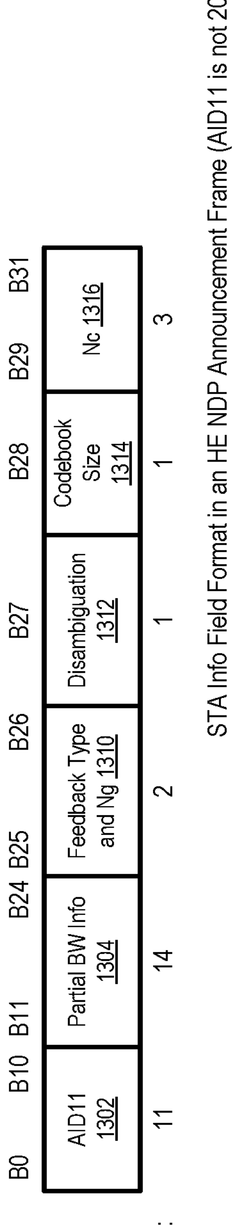
FIG. 13 is a diagram showing a STA info field format in a HE NDP announcement frame (when AID11 is not 2047).

FIG. 13 is a diagram showing a STA info field format in a HE NDP announcement frame (when AID11 is not 2047). As shown in the diagram, the STA info field format includes an AID11 field 1302 (11 bits), a partial bandwidth (BW) info field 1304 (14 bits), a feedback type and Ng field 1310 (2 bits), a disambiguation field 1312 (1 bit), a codebook size field 1314 (1 bit), and a Nc field 1316 (3 bits).

Figure 14:
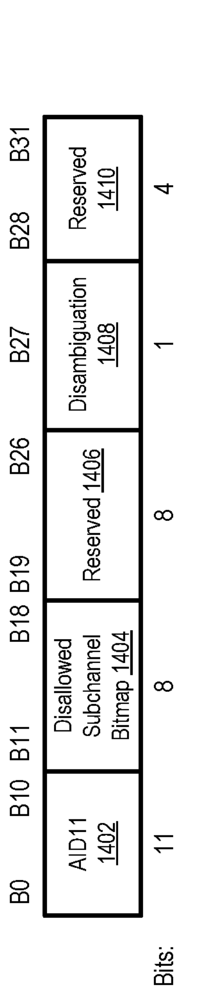
FIG. 14 is a diagram showing a STA info field format in a HE NDP announcement frame (when AID11 is 2047).

FIG. 14 is a diagram showing a STA info field format in a HE NDP announcement frame (when AID11 is 2047). As shown in the diagram, the STA info field format includes an AID11 field 1402 (11 bits), a disallowed subchannel bitmap field 1404 (8 bits), a reserved field 1406 (8 bits), a disambiguation field 1408 (1 bit), and a reserved field 1410 (4 bits). In IEEE 802.11ax, STA info field with AID11 set to 2047 (AID11=2047) is used for special purposes and it does not include actual STA information.

It should be noted that, as shown in FIG. 11, the HE NDP announcement frame format in IEEE 802.11ax only includes beamformee information.

To support multi-AP cooperation, different frame exchange sequences are needed depending on the cooperation scheme such as JTX or CoBF. For JTX with two APs (where one functions as a master AP and the other functions as a slave AP), an example frame exchange sequence is shown in FIG. 15, which is further described herein below.

In an embodiment, the master AP sends a modified NDP announcement frame to both a slave AP and a non-AP STA. The modified NDP announcement frame may have two objectives: (1) for the STA, the NDP announcement frame serves its original purpose (e.g., to indicate that a NDP frame is to be transmitted to the STA); and (2) for the slave AP, the NDP announcement frame indicates that the slave AP is to transmit a NDP frame (e.g., it triggers/causes the slave AP to transmit a NDP frame).

In an embodiment, the NDP announcement frame includes two different information fields with different destinations (with different objectives) that can be multiplexed in the resource unit (RU) domain with different subcarriers in OFDM symbols. For example, part of a RU (e.g., subcarriers) may be used to transmit information to a STA and another part of the RU (e.g., the remaining subcarriers) may be used to transmit information to a slave AP. In an embodiment, RU allocation information of the slave AP and STA is included as common information. In an embodiment, the NDP announcement frame includes NDP announcement frame type information indicating the NDP announcement frame type, which may be one of normal NDP announcement frame (without multi-AP cooperation), JTX NDP announcement frame (multi-AP cooperation for JTX), and CoBF NDP announcement frame (multi-AP cooperation for CoBF). In an embodiment, as an alternative to RU multiplexing, the information to the slave AP may be included in multiple STA info fields with specific AID11.

Figure 15:
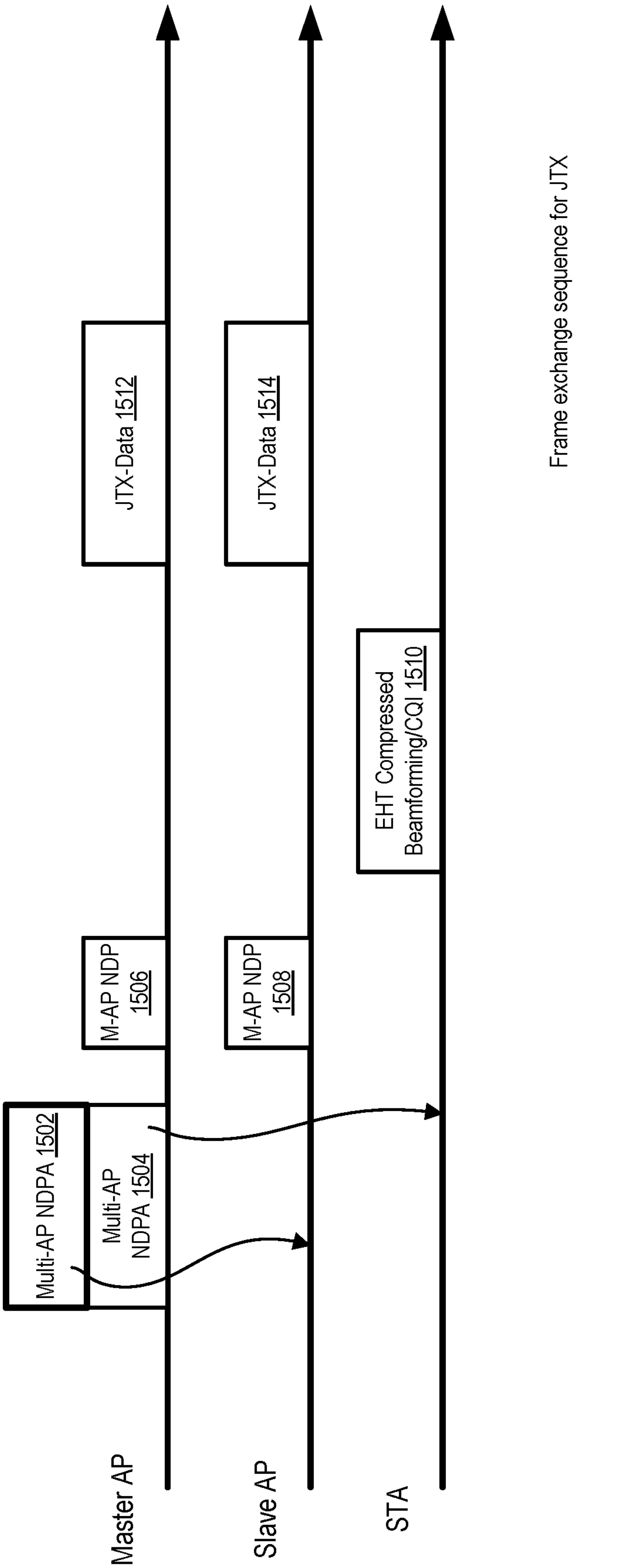
FIG. 15 is a diagram showing a frame exchange sequence for joint transmission (JTX), according to some embodiments.

FIG. 15 is a diagram showing a frame exchange sequence for JTX, according to some embodiments.

As shown in the diagram, a master AP may initiate the frame exchange sequence by transmitting a multi-AP NDP announcement frame 1502 and a multi-AP NDP announcement frame 1504. Multi-AP NDP announcement frame 1502 (in bolded lines), which may be transmitted using a first RU, may contain information for the slave AP and multi-AP NDP announcement frame 1504, which may be transmitted using a second RU, may contain information for the STA. Multi-AP NDP announcement frame 1502 and multi-AP NDP announcement frame 1504 may collectively be referred to herein as a NDP announcement frame that includes two sets of information (one for the slave AP and one for the STA). In an embodiment, the information for the slave AP may indicate the cooperation type ("cooperation type=JTX"), indicate that data is to be sent to the STA with JTX, and indicate the NDP frame transmission structure. The NDP frame transmission structure may include information regarding the size of the "P" matrix (which is defined in IEEE 802.11ax to generate an NDP frame) and the portion of the "P" matrix corresponding to antenna indices of the slave AP to make the NDP frame for the slave AP.

After the master AP transmits the multi-AP NDP announcement frames 1502 and 1504, the master AP and the slave AP may transmit multi-AP NDP frames 1506 and 1508, respectively, to the STA. In response to receiving the multi-AP NDP frames 1506 and 1508, the STA may transmit an EHT CBF/CQI frame 1510 to the master AP and the slave AP. The master AP and slave AP may acquire beam information (e.g., from the EHT CBF/CQI frame 1510) and jointly transmit JTX data frames 1512 and 1514, respectively, to the STA.

Figure 16:
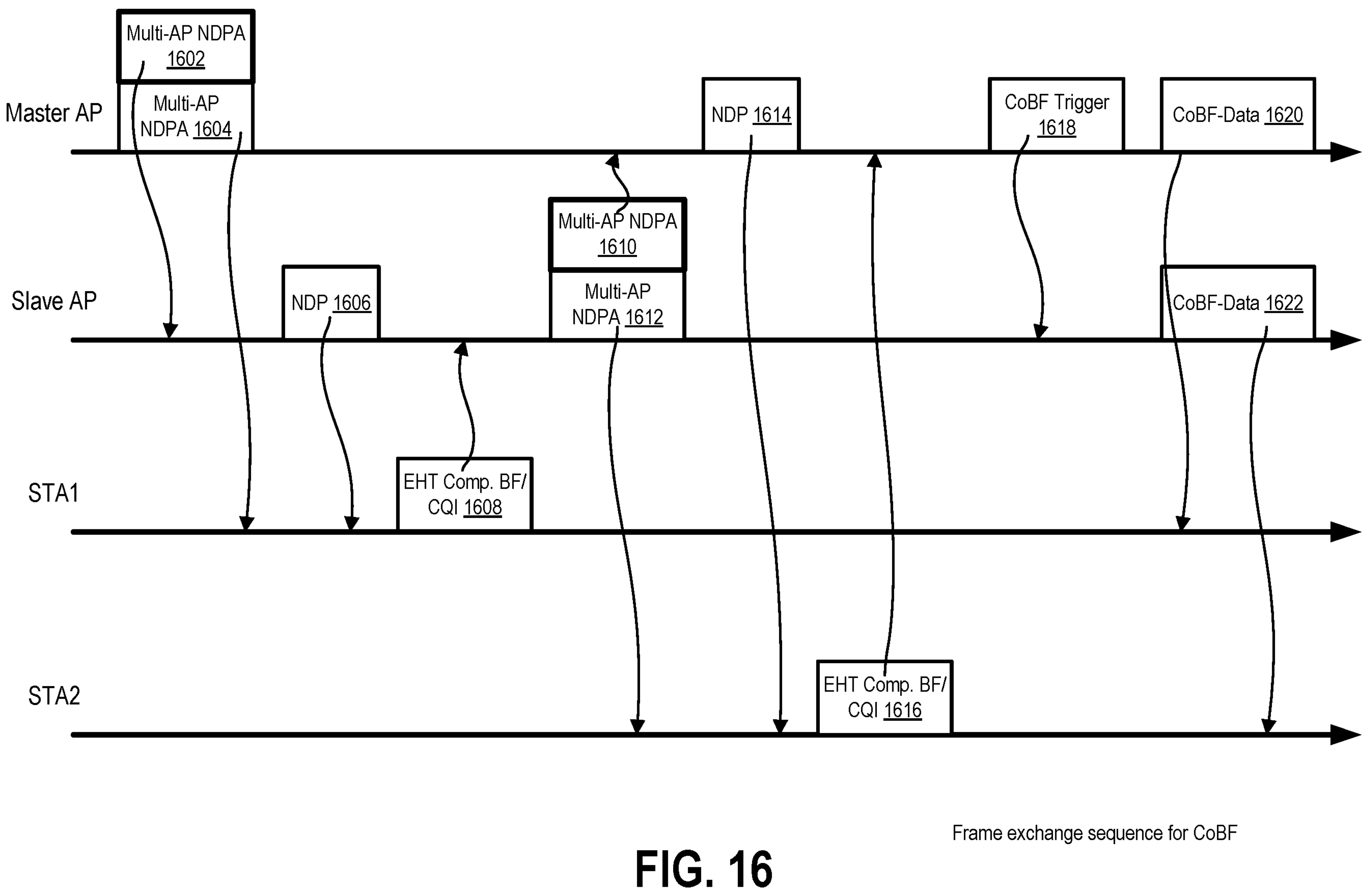
FIG. 16 is a diagram showing a frame exchange sequence for coordinated beamforming (CoBF), according to some embodiments.

FIG. 16 is a diagram showing a frame exchange sequence for CoBF, according to some embodiments.

In a CoBF with two APs (a master AP and slave AP) and two STAs (one for each AP), the two APs may transmit their own data to their respective STAs without interfering with each other (e.g., one AP transmits its frame onto the null-space of the other BSS STA's channel matrix).

As shown in the diagram, the master AP may initiate the frame exchange sequence by transmitting multi-AP NDP announcement frames 1602 and 1604 to the slave AP and STA1 (which is under the master AP), respectively. Multi-AP NDP announcement frame 1602 (in bolded lines), which may be transmitted using a first RU, may contain information for the slave AP and multi-AP NDP announcement frame 1604, which may be transmitted using a second RU, may contain information for STA1. Multi-AP NDP announcement frame 1602 and multi-AP NDP announcement frame 1604 may collectively be referred to herein as a NDP announcement frame that includes two sets of information (one for the slave AP and one for STA1). The NDP announcement frames 1602 and 1604 may have two objectives: (1) for the slave AP, the NDP announcement frame 1602 indicates that the slave AP is to transmit a NDP frame to STA1 to obtain channel information; (2) for STA1, the NDP announcement frame 1604 indicates that the slave AP will transmit an NDP frame. In response to receiving the NDP announcement frame 1602, the slave AP transmits a NDP frame 1606 to STA1. In response to receiving the NDP frame 1606, STA1 transmits an EHT CBF/CQI frame 1608 to the slave AP.

Next, the slave AP may send modified multi-AP NDP announcement frames 1610 and 1612 to the master AP and STA2 (which is under the slave AP), respectively. Multi-AP NDP announcement frame 1610 (in bolded lines), which may be transmitted using a first RU, may contain information for the master AP and multi-AP NDP announcement frame 1612, which may be transmitted using a second RU, may contain information for STA2. Multi-AP NDP announcement frame 1610 and multi-AP NDP announcement frame 1612 may collectively be referred to herein as a NDP announcement frame that includes two sets of information (one for the master AP and one for STA2). The NDP announcement frames 1610 and 1612 may have two objectives: (1) for the master AP, the NDP announcement frame 1610 indicates that the master AP is to transmit a NDP frame to STA2 to obtain channel information; and (2) for STA2, the NDP announcement frame 1612 indicates that the master AP will transmit a NDP frame. In response to receiving the NDP announcement frame 1610, the master AP transmits a NDP frame 1614 to STA2. In response to receiving the NDP frame 1614, STA2 transmits an EHT CBF/CQI frame 1616 to the master AP.

In an embodiment, after completing the above-described frame exchange to obtain CBF/CQI information for CoBF, the master AP may send a CoBF trigger frame 1618 to the slave AP to initiate CoBF data frame transmission. The transmission of the CoBF trigger frame 1618 may not be needed (it is optional) if it is assumed that the EHT CBF/CQI frame 1616 is received by both the master AP and slave AP. The master AP and the slave AP may (simultaneously/concurrently) transmit CoBF data frames 1620 and 1622, respectively, after receiving the EHT CBF/CQI frame from STA2 (without the transmissions interfering with each other (e.g., by transmitting onto the null-space of the other channel)).

Particular frame exchange sequences are shown in the diagrams and described herein to help illustrate embodiments. The frame exchange sequences shown in the diagrams should be regarded as illustrative rather than limiting. It should be appreciated that a different frame exchange sequence (e.g., using more/less frames and/or using different types of frames) can be used to achieve the same/similar functionality. While an example of multi-AP cooperation of two APs is shown and described above, it should be appreciated that the AP cooperation frame exchange sequence can be extended to allow cooperation between more than two APs. For example, a master AP may cooperate with multiple slave APs by including information for the multiple slave APs in the NDP announcement frame.

Frame exchange sequences for multi-AP cooperative transmissions (e.g., JTX and CoBF) have been described herein above. By defining/using a new dual-function NDP announcement frame, embodiments may efficiently initiate/initialize AP cooperation to improve network performance. In particular, the new NDP announcement frame may contain information for both a cooperating AP and a STA in an RU multiplexing manner to achieve multiple objectives, as described herein above, which simplifies/streamlines the multi-AP cooperation process.

Figure 17:
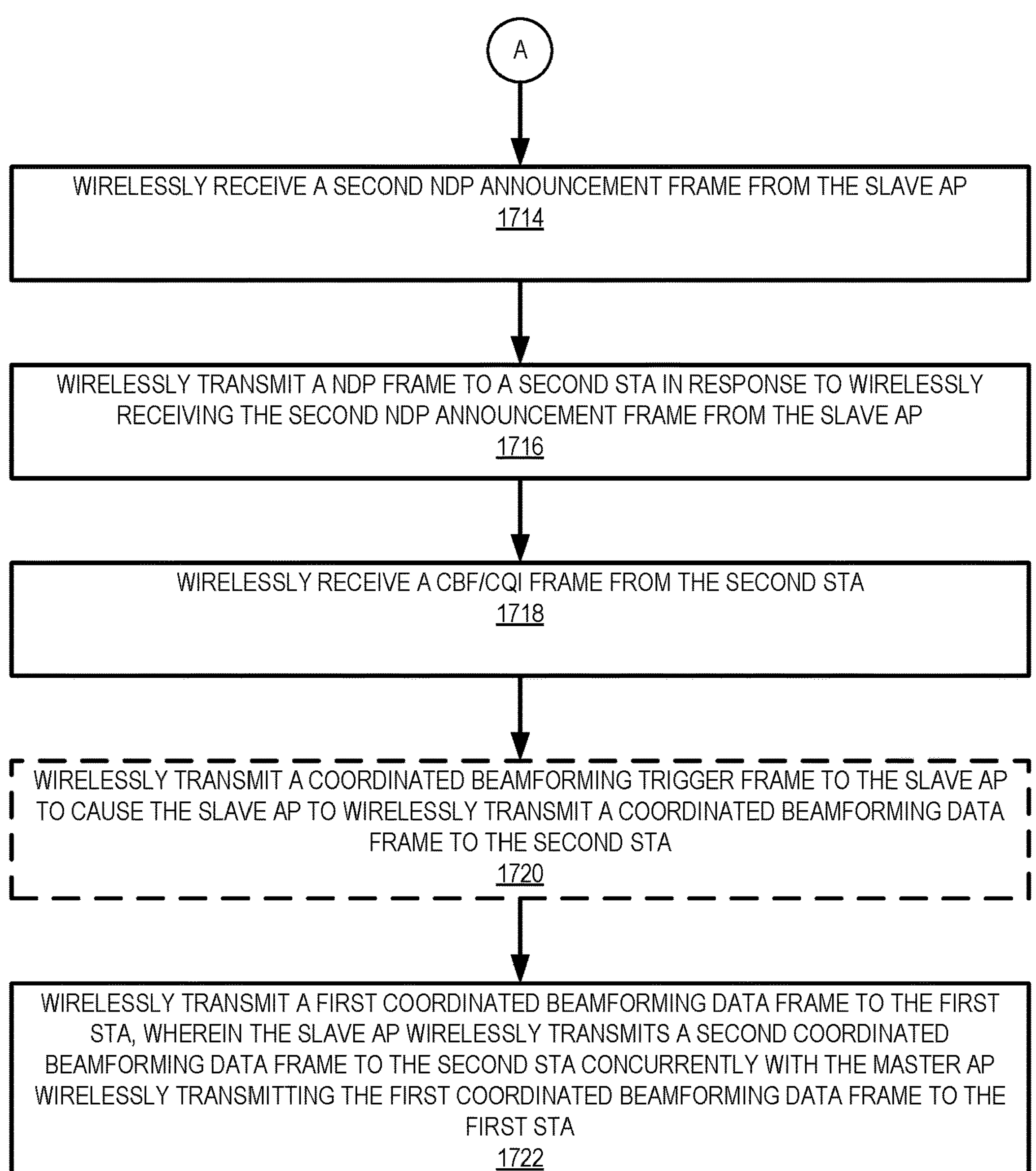
FIG. 17 is a flow diagram showing a method performed by a master AP for performing multi-AP cooperation, according to some embodiments.

Turning now to FIG. 17, a method 1700 will be described for performing multi-AP cooperation, in accordance with an example embodiment. The method 1700 may be performed by one or more devices described herein. For example, the method 1700 may be performed by a wireless device 104 functioning as a master AP in a wireless network.

Additionally, although shown in a particular order, in some embodiments the operations of the method 1700 (and the other methods shown in the other figures) may be performed in a different order. For example, although the operations of the method 1700 are shown in a sequential order, some of the operations may be performed in partially or entirely overlapping time periods.

As shown in FIG. 17, the method 1700 may commence at operation 1702 with a master AP generating a first NDP announcement frame, wherein the first NDP announcement frame includes first information for a first non-AP STA and second information for the slave AP, wherein the first information indicates to the first STA that a NDP frame is to be transmitted to the first STA and the second information indicates to the slave AP to wirelessly transmit a NDP frame to the first STA. In an embodiment, the second information includes an indication of an AP cooperation type, wherein the AP cooperation type is joint transmission or coordinated beamforming.

At operation 1704, the master AP wirelessly transmits the NDP announcement frame to the first STA and the slave AP (e.g., as a multicast frame). In an embodiment, the first information is wirelessly transmitted in a first resource unit and the second information is wirelessly transmitted in a second resource unit that is different from the first resource unit. In an embodiment, the first NDP announcement frame includes resource unit allocation information for the first resource unit and the second resource unit (e.g., as common information). In an embodiment, the first information is included in a first STA information field of the first NDP announcement frame and the second information is included in a second STA information field of the first NDP announcement frame, wherein the first STA information field is addressed to the first STA and the second STA information field is addressed to the slave AP.

At operation 1706, the master AP determines whether the cooperation scheme is JTX or CoBF. If the cooperation scheme is JTX, then the method proceeds to operation 1708.

At operation 1708, the master AP wirelessly transmits a NDP frame to the first STA, wherein the slave AP also wirelessly transmits a NDP frame to the first STA after the master AP wirelessly transmits the first NDP announcement frame to the first STA and the slave AP.

At operation 1710, the master AP wirelessly receives a CBF/CQI frame from the first STA, wherein the slave AP also wirelessly receives the CBF/CQI frame from the first STA.

At operation 1712, the master AP wirelessly transmits a joint transmission data frame to the first STA jointly with the slave AP (e.g., the master AP and the slave AP transmit simultaneously/concurrently using beamforming (based on information included in the CBF/CQI frame)).

Returning to operation 1706, if the cooperation scheme is CoBF, then the method proceeds to operation 1714.

At operation 1714, the master AP wirelessly receives a second NDP announcement frame from the slave AP. The second NDP announcement frame may include information for the master AP that indicates to the master AP to wirelessly transmit a NDP frame to a second STA.

At operation 1716, the master AP wirelessly transmits a NDP frame to a second STA in response to wirelessly receiving the second NDP announcement frame from the slave AP.

At operation 1718, the master AP wirelessly receives a CBF/CQI frame from the second STA.

In an embodiment, at operation 1720, the master AP wirelessly transmits a coordinated beamforming trigger frame to the slave AP to cause the slave AP to wirelessly transmit a coordinated beamforming data frame to the second STA.

At operation 1722, the master AP wirelessly transmits a first coordinated beamforming data frame to the first STA, wherein the slave AP wirelessly transmits a second coordinated beamforming data frame to the second STA concurrently with the master AP wirelessly transmitting the first coordinated beamforming data frame to the first STA (e.g., using the information included in the CBF/CQI frame to reduce interference of the two transmissions).

Figure 18:
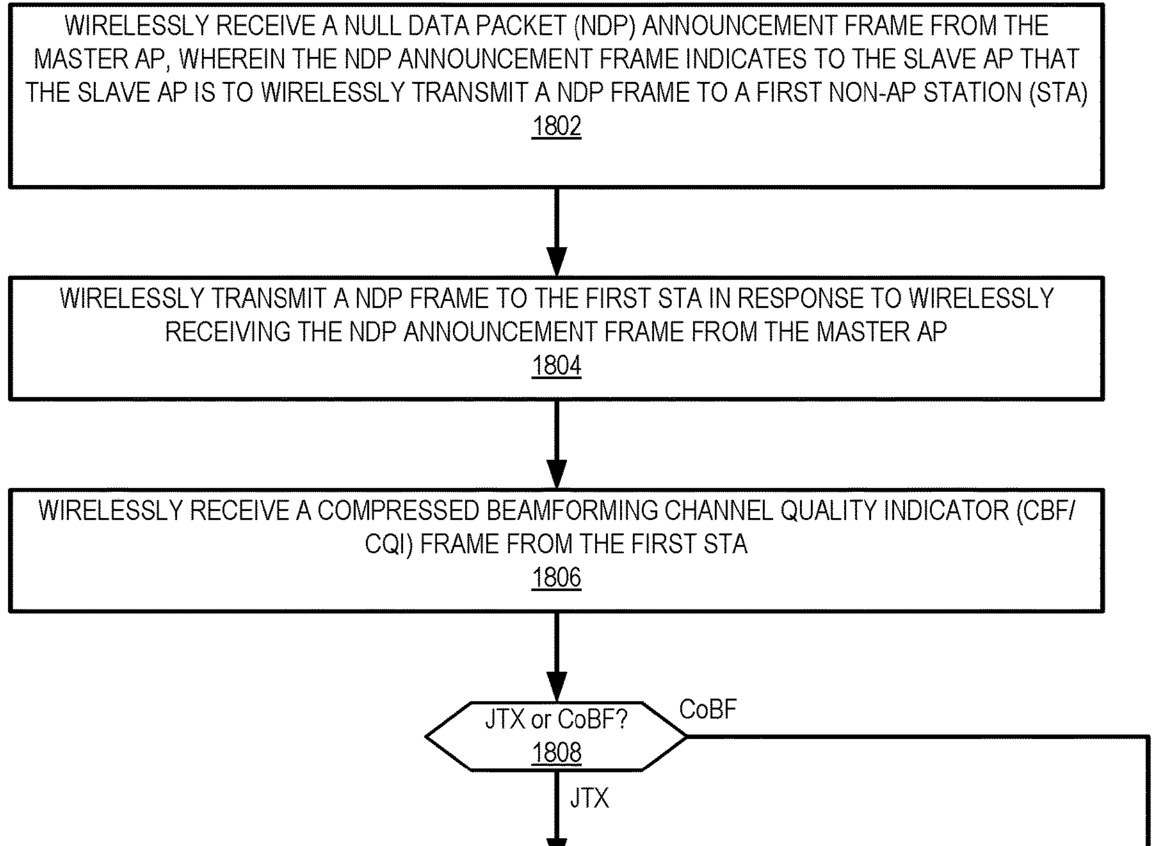
FIG. 18 is a flow diagram showing a method performed by a slave AP for performing multi-AP cooperation, according to some embodiments.

Turning now to FIG. 18, a method 1800 will be described for performing multi-AP cooperation, in accordance with an example embodiment. The method 1800 may be performed by one or more devices described herein. For example, the method 1800 may be performed by a wireless device 104 functioning as a slave AP in a wireless network.

As shown in FIG. 18, the method 1800 may commence at operation 1802 with a slave AP wirelessly receiving a NDP announcement frame from the master AP, wherein the NDP announcement indicates to the slave AP that the slave AP is to wirelessly transmit a NDP frame to a first non-AP STA.

At operation 1804, the slave AP wirelessly transmits a NDP frame to the first STA in response to wirelessly receiving the NDP announcement frame from the master AP.

At operation 1806, the slave AP wirelessly receives a CBF/CQI frame from the first STA.

At operation 1808, the slave AP determines whether the cooperation scheme is JTX or CoBF. If the cooperation scheme is JTX, then the method proceeds to operation 1810.

At operation 1810, the slave AP wirelessly transmits a joint transmission data frame to the first STA jointly with the master AP.

Returning to operation 1808, if the cooperation scheme is CoBF, then the method proceeds to operation 1812.

At operation 1812, the slave AP wirelessly transmits a first coordinated beamforming data frame to a second STA, wherein the master AP wirelessly transmits a second coordinated beamforming data frame to the first STA concurrently with the slave AP wirelessly transmitting the first coordinated beamforming data frame to the second STA.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method by a wireless device functioning as a master access point (AP) to perform multi-AP cooperation with a slave AP, the method comprising:

generating a first null data packet (NDP) announcement frame, wherein the first NDP announcement frame explicitly includes first information for a first non-AP station (STA) configured to indicate to the first STA that an NDP frame will be transmitted to the first STA and second information for the slave AP configured to command the slave AP to transmit, in response to receipt of the NDP announcement frame, an NDP frame to the first STA;

wirelessly transmitting the NDP announcement frame as a multicast frame to the first STA and the slave AP; and wirelessly transmitting, in response to the NDP announcement frame, NDP frames from the master AP and the slave AP simultaneously using distinct beamforming patterns, the beamforming patterns configured to improve channel estimation accuracy at the first non-AP STA.

2. The method of claim 1, wherein the first information is wirelessly transmitted in a first resource unit and the second information is wirelessly transmitted in a second resource unit that is different from the first resource unit.

3. The method of claim 2, wherein the first NDP announcement frame includes resource unit allocation information for the first resource unit and the second resource unit.

4. The method of claim 1, wherein the first information is included in a first STA information field of the first NDP announcement frame and the second information is included in a second STA information field of the first NDP announcement frame, wherein the first STA information field is addressed to the first STA and the second STA information field is addressed to the slave AP.

5. The method of claim 1, wherein the second information includes an indication of an AP cooperation type, wherein the AP cooperation type is joint transmission or coordinated beamforming.

6. The method of claim 1, further comprising:

wirelessly transmitting a NDP frame to the first STA after wirelessly transmitting the first NDP announcement frame to the first STA and the slave AP, wherein the slave AP also wirelessly transmits a NDP frame to the first STA after the master AP wirelessly transmits the first NDP announcement frame to the first STA and the slave AP;

wirelessly receiving a compressed beamforming channel quality indicator (CBF/CQI) frame from the first STA after wirelessly transmitting the NDP frame to the first STA, wherein the slave AP also wirelessly receives the CBF/CQI frame from the first STA; and wirelessly transmitting a joint transmission data frame to the first STA jointly with the slave AP.

7. The method of claim 1, further comprising:

wirelessly receiving a second NDP announcement frame from the slave AP;

wirelessly transmitting a NDP frame to a second STA in response to wirelessly receiving the second NDP announcement frame from the slave AP;

wirelessly receiving a compressed beamforming channel quality indicator (CBF/CQI) frame from the second STA after wirelessly transmitting the NDP frame to the second STA; and wirelessly transmitting a first coordinated beamforming data frame to the first STA after wirelessly receiving the CBF/CQI frame from the second STA, wherein the slave AP wirelessly transmits a second coordinated beamforming data frame to the second STA concurrently with the master AP wirelessly transmitting the first coordinated beamforming data frame to the first STA.

8. The method of claim 7, further comprising:

wirelessly transmitting a coordinated beamforming trigger frame to the slave AP to cause the slave AP to wirelessly transmit the second coordinated beamforming data frame to the second STA.

9. A method by a wireless device functioning as a slave access point (AP) to perform multi-AP cooperation with a master AP, the method comprising:

wirelessly receiving a null data packet (NDP) announcement frame from the master AP, wherein the NDP announcement frame explicitly includes information configured to command the slave AP that the slave AP to transmit, in response to receipt of the NDP announcement frame, an NDP frame to a first non-AP station (STA); and wirelessly transmitting, in response to receipt of the NDP announcement frame, an NDP frame to the first non-AP STA simultaneously with an NDP frame transmitted by the master AP using a beamforming pattern distinct from a beamforming pattern used by the master AP, the beamforming pattern configured to improve channel estimation accuracy at the first non-AP STA.

10. The method of claim 9, further comprising:

wirelessly receiving a compressed beamforming channel quality indicator (CBF/CQI) frame from the first STA after wirelessly transmitting the NDP frame to the first STA.

11. The method of claim 10, further comprising:

wirelessly transmitting a joint transmission data frame to the first STA jointly with the master AP.

12. The method of claim 10, further comprising:

wirelessly transmitting a first coordinated beamforming data frame to a second STA after wirelessly receiving the CBF/CQI frame from the first STA, wherein the master AP wirelessly transmits a second coordinated beamforming data frame to the first STA concurrently with the slave AP wirelessly transmitting the first coordinated beamforming data frame to the second STA.

13. A wireless device configured to function as a master access point (AP) to perform multi-AP cooperation with a slave AP, the wireless device comprising:

a radio frequency transceiver;

a memory device storing a set of instructions; and a processor coupled to the memory device, wherein the set of instructions when executed by the processor causes the master AP to:

generate a first null data packet (NDP) announcement frame that explicitly includes first information for a first non-AP station (STA) and second information for the slave AP configured to command the slave AP to transmit, in response to receipt of the NDP announcement frame, an NDP frame to the first STA;

wirelessly transmit the NDP announcement frame as a multicast frame to the first STA and the slave AP; and wirelessly transmit, in response to the NDP announcement frame, an NDP frame from the master AP simultaneously with an NDP frame transmitted by the slave AP using distinct beamforming patterns configured to improve channel estimation accuracy at the first non-AP STA.

14. The wireless device of claim 13, wherein the first information is wirelessly transmitted in a first resource unit and the second information is wirelessly transmitted in a second resource unit that is different from the first resource unit.

15. The wireless device of claim 14, wherein the first NDP announcement frame includes resource unit allocation information for the first resource unit and the second resource unit.

16. The wireless device of claim 13, wherein the first information is included in a first STA information field of the first NDP announcement frame and the second information is included in a second STA information field of the first NDP announcement frame, wherein the first STA information field is addressed to the first STA and the second STA information field is addressed to the slave AP.

17. The wireless device of claim 13, wherein the second information includes an indication of an AP cooperation type, wherein the AP cooperation type is joint transmission or coordinated beamforming.

18. The wireless device of claim 13, wherein the set of instructions when executed by the processor further causes the master AP to:

wirelessly transmit a NDP frame to the first STA after wirelessly transmitting the first NDP announcement frame to the first STA and the slave AP, wherein the slave AP also wirelessly transmits a NDP frame to the first STA after the master AP wirelessly transmits the first NDP announcement frame to the first STA and the slave AP, wirelessly receive a compressed beamforming channel quality indicator (CBF/CQI) frame from the first STA after wirelessly transmitting the NDP frame to the first STA, wherein the slave AP also wirelessly receives the CBF/CQI frame from the first STA, and wirelessly transmit a joint transmission data frame to the first STA jointly with the slave AP.

19. The wireless device of claim 13, wherein the set of instructions when executed by the processor further causes the master AP to:

wirelessly receive a second NDP announcement frame from the slave AP, wirelessly transmit a NDP frame to a second STA in response to wirelessly receiving the second NDP announcement frame from the slave AP, wirelessly receive a compressed beamforming channel quality indicator (CBF/CQI) frame from the second STA after wirelessly transmitting the NDP frame to the second STA, and wirelessly transmit a first coordinated beamforming data frame to the first STA after wirelessly receiving the CBF/CQI frame from the second STA, wherein the slave AP wirelessly transmits a second coordinated beamforming data frame to the second STA concurrently with the master AP wirelessly transmitting the first coordinated beamforming data frame to the first STA.

20. The wireless device of claim 19, wherein the set of instructions when executed by the processor further causes the master AP to:

wirelessly transmit a coordinated beamforming trigger frame to the slave AP to cause the slave AP to wirelessly transmit the second coordinated beamforming data frame to the second STA.

* * * * *